Nov. 11, 1924.

R. HUMPHRIES 1,515,047

TRANSMISSION

Filed July 30, 1923  2 Sheets-Sheet 1

INVENTOR
Ralph Humphries
BY
ATTORNEY

Nov. 11, 1924.

R. HUMPHRIES

TRANSMISSION

Filed July 30, 1923   2 Sheets-Sheet 2

1,515,047

INVENTOR
Ralph Humphries
BY
ATTORNEY

Patented Nov. 11, 1924.

1,515,047

UNITED STATES PATENT OFFICE.

RALPH HUMPHRIES, OF DETROIT, MICHIGAN.

TRANSMISSION.

Application filed July 30, 1923. Serial No. 654,786.

*To all whom it may concern:*

Be it known that I, RALPH HUMPHRIES, of the city of Detroit, county of Wayne, and State of Michigan, have invented certain new and useful Improvements in Transmissions, of which the following is a specification.

It is a primary object of my invention to provide a transmission wherein all of the speeds usually desired in automotive construction, that is to say first, second and third speeds, may be had by direct drive from the engine without the use of a countershaft.

It is a further object of my invention to provide a transmission housed in a compartment which is movable as a whole in a longitudinal direction and the gears of which are selectively operable laterally.

It is a further object of my invention to provide a shaft located in said housing upon which said gears are adapted to slide which said shaft is adapted to act and perform as a gear in attaining a certain speed.

It is a further object of my invention to eliminate a large number of the gears and certain shafts usually employed in automotive transmissions and to substitute therefor an economical and efficient transmission having a minimum number of gears and no countershaft for forward driving.

It is a further object of my invention to provide with such mechanism a reverse drive of simple and economical construction.

With these and other objects in view my invention consists in the arrangement, combination and construction of the various parts of my improved device as described in the specification, claimed in my claims and shown in the accompanying drawings:

Figure 1:
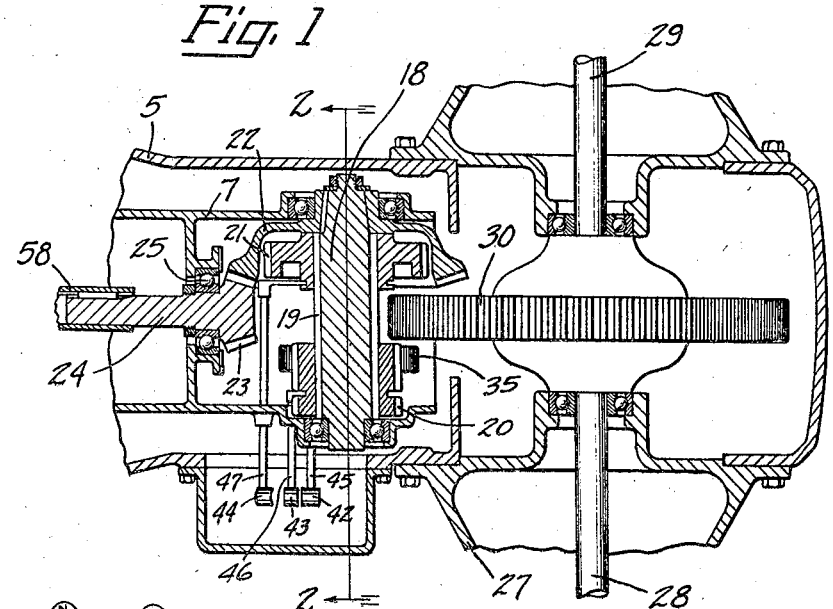
Fig. 1 is a top sectional view of my improved transmission.

I have shown a housing 5 such as is ordinarily seen in tractors within which a transmission housing or box composed of two sections 6 and 7 is adapted to be mounted. I provide a cap 8 on the top of the housing 5, which is secured thereon by means of a series of bolts 9 so that access may be had to the transmission housing.

I also provide a series of bolts 10 extending thru offsets 13 in the bottom and top of the housing 5 having nuts 11 on their outer ends outside of the housing 5 and nuts 12 intermediate their ends inside of the housing 5 so as to rigidly secure the same in place. The bolts 10 are provided on their inner ends with enlarged centrally grooved heads 14 in which the projections 15 of the box or transmission housing composed of the sections 6 and 7 are adapted to slide and be supported.

Positioned in the sides 6 and 7 of the transmission housing or box are ball bearings 16 and 17 respectively in which a shaft 18 is adapted to rotate. The shaft 18 is provided with a plurality of longitudinally extending grooves 19 in which gears 20 and 21 mounted on the shaft 18 are adapted to slide laterally, said gears being provided with grooves or keyways cooperating with the grooves 19 so that they will turn with the shaft 18.

Also mounted on the shaft 18 is a gear 22 adapted to mesh with a gear 23 provided on the end of a drive shaft 24, keyed on the main drive shaft 58, (such as is usually employed with an internal combustion engine) journaled in bearings 25 and 26. Thus the shaft 24 is longitudinally movable without disconnection from the main drive shaft.

I have also shown a rear axle housing 27 within which are provided axle sections 28 and 29 connected on their inner ends by the usual differential gears with a gear 30, which is adapted to mesh with the hereinbefore mentioned gears selectively.

I have also provided a shaft 31 journaled in the box composed of the sections 6 and 7 at 32 and 33 and secured in place by embedding the same at 32 and by a nut 34 at the end 33. The shaft 31 is also grooved and has a gear 35 keyed thereon so as to be laterally movable thereon which said gear 35 is constantly meshing with the gear 20. The gear 20 is of sufficient width that when it is shifted laterally some portion thereof always meshes with the gear 35.

I have provided further an extension 36 on the side of the housing 5 within which a gear shift lever 37 is adapted to extend and to be pivoted as at 38 by means of the ball 39 thereon. The lower portion of the gear shift lever 37 is connected to a shaft 40 whose inner end is rigidly fixed to the box composed of the sections 6 and 7 on the side 7 thereof. Thus by pushing the gear shift lever backward and forward in a longitudinal direction the said box will be caused to be moved backward and forward on the projections 15 in the grooved heads 14 of the bolts 10. This longitudinal movement of the gear shift lever 37 will cause the lowermost end thereof 41 to move thru the channels 42, 43 and 44 provided on the shafts 45, 46 and 47 respectively. The shaft 45 extends into the box and is connected to the gear 20 by means of the prong 48 extending into the circumferential groove 55 in the gear 20. The shaft 46 extends into the box and is connected by means of the prong 49 extending into the groove 56 to the gear 35. The shaft 47 extends into the box and is connected by the prong 50 extending into the groove 57 to the gear 21. Thus sidewise movement of the gear shift lever 37 will cause sidewise movement of either the gear 20, 35 or 21 depending upon its longitudinal position, that is to say whether the end 41 thereof is in the trough 42, the trough 43 or the trough 44.

In the practical operation of my improved device, the gears being in neutral as shown in Fig. 1, to attain low speed, the gear shift lever is moved longitudinally forward so as to push the box backwardly until the grooves 19 provided in the shaft 18 mesh with the gear teeth on the gear 30 at which time the drive shaft 24 will be connected thru the said shaft 18 and gear 30 with the axle sections 28 and 29 so as to cause rotation thereof.

To attain second speed, the gear shift lever is moved rearwardly until the teeth on the gear 20 are opposite the teeth on the gear 30 and then the gear shift lever, whose end 41 will at that time be positioned in the trough 42, is pushed to the right until the gear 20 meshes with the gear 30 when the same mechanical hook-up is had as in first speed with the exception that the gear 20, being larger than the grooved shaft 18, will, of course, give greater speed to the axles.

In order to attain high speed, the gear shift lever is pulled backwardly even yet a greater distance until the teeth of the gear 21 are directly opposite the teeth on the gear 30, at which time the end 41 of the gear shift lever 37 will be positioned in the trough 44 and the gear shift lever is then moved to the left until the gear 21 meshes with the gear 30 and a still higher speed, because of the larger diameter of the gear 21, will be attained.

In order to attain reverse speed the gear shift lever is moved until the teeth on the gear 35 are opposite those on the gear 30 at which time the end 41 of the gear shift lever 37 will be straddling the troughs 42 and 43 so that movement to the left of the gear shift lever will cause both the gear 20 and the gear 35 to move to the right until the gear 35 meshes with the gear 30. The power then will be transmitted thru the shaft 18 to the gear 20, which will cause reverse movement of the gear 35 and gear 30 thus giving a reverse movement to the axle sections 28 and 29.

Figure 2:
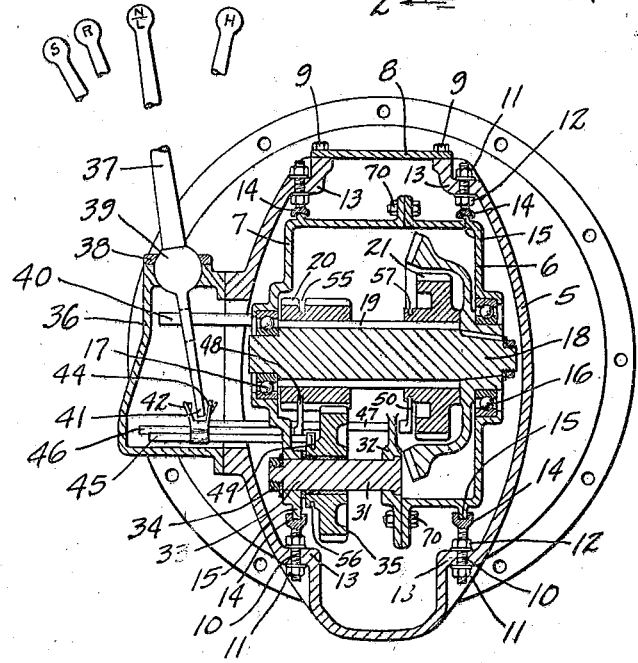
Fig. 2 is a central sectional view thereof taken on line 2—2 of Fig. 1.
Figure 4:
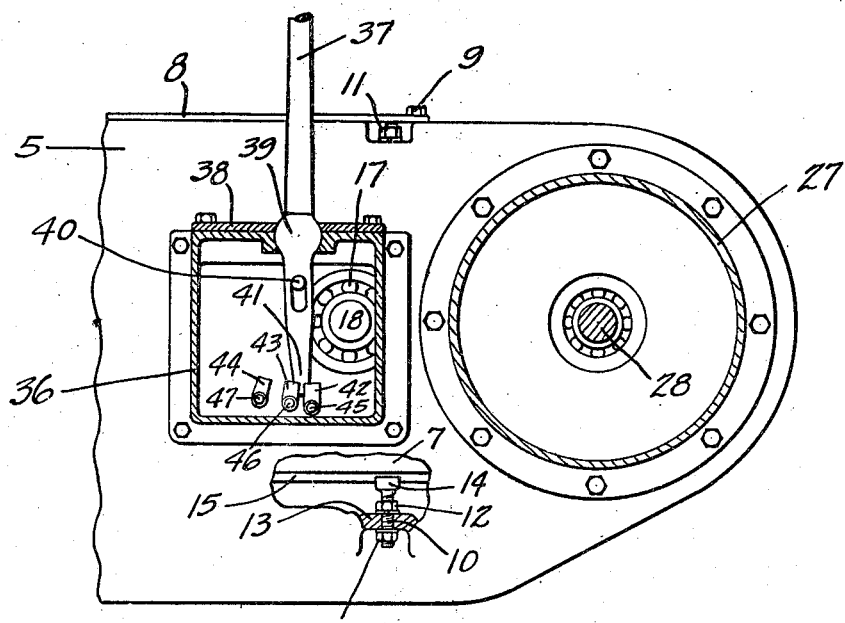
Fig. 4 is a side view partly in section, with certain parts broken away.

I have shown in Fig. 2 the various positions of the gear shift lever when moving the gears laterally in order to attain the various speeds.

Figure 3:
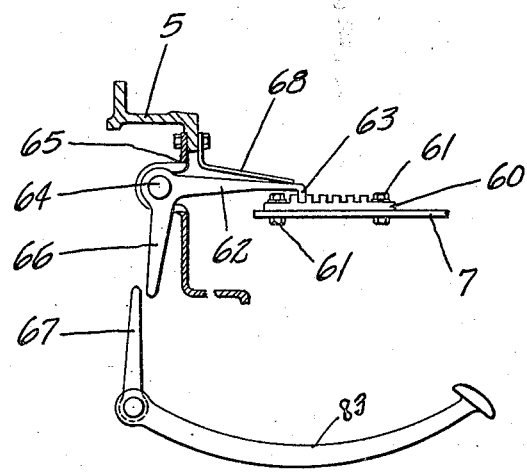
Fig. 3 is a detailed view of a longitudinal movement control employed in my improved device.

Having once brought a specified gear into mesh with the gear 30 it is desirable to lock the same in position to prevent longitudinal movement thereof and in order to accomplish this I have provided a rack 60 on the top of the portion 7 of the box or housing, which is bolted in place by bolts 61. I then provide a finger 62 having a projection 63 adapted to engage with the teeth of the rack and pivoted at 64 upon an extension 65 from the main housing 5, as shown in Fig. 3. This mechanism being directly on the top of the transmission box or housing is not shown in the other figures.

Another finger 66 connected with the finger 62 and extending at substantially right angles thereto is adapted to be operated by the lever 67 extending from the clutch pedal 83 or some other suitable mechanism. The operation then is that upon depression of the clutch pedal the lever 67 will be moved against the bottom of the finger 66 to move it rearwardly at the same time causing the elevation of the finger 62 and withdrawal of the portion 63 thereof from the rack 60. The box or transmission housing may then be moved to its desired position and when the clutch is released so as to permit the transmission to function, the spring which is constantly bearing down upon the finger 62 will cause the finger 62 to move downwardly so that the point 63 thereof will engage with the rack 60 and prevent further longitudinal movement of the box or transmission housing until the clutch is again thrown out and the finger 62 accordingly raised.

I desire it to be understood that my improved mechanism may be used on any type of axle whether it be solid, semi-floating, three-quarter floating or full floating. I have accordingly not shown the differential gears and connection of the rear axles in the drawing except to show the gear 30 operable with the rear axle.

I desire it to be understood that a number of other changes may be made in the arrangement, combination and construction of the various parts of my improved device without departing from the spirit of my invention and it is my intention to cover by my claims such changes as may be reasonably included within the scope thereof.

I have thought it unnecessary to include in my drawings certain portions of tractors or like vehicles with which my improved device might be used for the reason that the same are old and well known constructions and the application of my improved structure thereto can be easily understood by those skilled in the art.

What I claim is:

1. In combination, a drive shaft and a rear axle, a shaft operably connected with said drive shaft and positioned at right angles thereto between the drive shaft and the rear axle, said shaft having a plurality of varying sized gears slideably mounted in grooves provided thereon, a gear connected with said rear axle and means for moving said shaft toward and from the rear axle and the gears thereon laterally to permit selective meshing of said gears and the grooves on said shaft with said gear connected to said rear axle.

2. In combination, a drive shaft and a rear axle, a shaft operably connected with said drive shaft positioned between the two having a plurality of varying sized gears slideably mounted thereon, means for moving said shaft in one direction and sliding the gears on said shaft in another direction to permit said gears to selectively mesh with a gear connected with said rear axle, and releasable means, consisting of a rack and pin, connected with the support for said shaft, for securing said shaft against movement when the hereinbefore mentioned gears have meshed, and a clutch pedal connected with said rack and pin for operating the same.

3. A movable transmission housing having a shaft mounted therein, gears slideably mounted on said shaft, a drive shaft operably connected with said first shaft, a rear axle connected with a gear for rotating the same, a lever connected with said housing adapted on movement in one direction to move said housing, a plurality of rods connected with said first gears and having channels on their outer ends through which the end of said lever passes when moving said housing, whereby movement of said lever in another direction will cause movement of at least one of said first gears on said first shaft to thus selectively connect said gears with the gear connected with the rear axle.

4. In combination, a drive shaft and a rear axle, a shaft operably connected with said drive shaft and positioned at right angles thereto between the drive shaft and the rear axle, said shaft having a plurality of varying sized gears slideably mounted thereon, means for moving said shaft longitudinally and said gears thereon laterally to permit said gears to selectively mesh with a gear connected with said rear axle; another shaft positioned at right angles to the plane of the drive shaft and having a gear slideably mounted thereon in engagement with a gear on said first shaft and adapted for selective engagement with the said gear connected with the rear axle, and a casing for said gears adapted to have oil therein into which said gear on said second shaft at right angles to the drive shaft may extend so as to splash and carry oil to other of said gears.

5. In combination, a drive shaft, a cross shaft connected with said drive shaft and having gears slideable thereon, means for connecting said gears with a rear axle, and means for moving said gears both transversely and longitudinally, consisting of a lever so connected with said gears that movement thereof in one direction will move said gears transversely and movement thereof in another direction will move them longitudinally.

6. In combination, a drive shaft, a cross shaft connected with said drive shaft and having gears slideable thereon means for selectively connecting said gears with a rear axle gear which consists of rods connected with said gears and another rod connected with said cross shaft, a lever connected with said rods and adapted on movement in one direction to move said cross shaft longitudinally of the drive shaft and on movement in another direction to move said gears transversely, said connecting rods for the gears being so positioned that a predetermined longitudinal movement will correctly position said lever to move transversely the gear which said longitudinal movement has adapted for engagement with said rear axle gear.

RALPH HUMPHRIES.